United States Patent [19]

Johnson

[11] 4,254,553

[45] Mar. 10, 1981

[54] MEASURING DEVICE

[76] Inventor: Andrew C. Johnson, Joplin, Mo.

[21] Appl. No.: 13,241

[22] Filed: Feb. 21, 1979

[51] Int. Cl.³ .............................................. G01B 3/22
[52] U.S. Cl. ............................... 33/169 R; 33/172 E;
33/147 E
[58] Field of Search ............. 33/147 E, 147 K, 147 R,
33/169 R, 172 R, 172 E, 172 B, 174 L, 346, 364;
116/DIG. 6, 330, 332

[56] References Cited

U.S. PATENT DOCUMENTS

| 1,044,555 | 11/1912 | Maul | 33/147 E |
|---|---|---|---|
| 2,159,335 | 5/1939 | Markwick | 33/147 E |
| 2,244,964 | 6/1941 | Poock et al. | 33/147 E |
| 2,431,013 | 11/1947 | Aller | 33/147 E |
| 2,590,184 | 3/1952 | Koulomzine | 33/364 X |
| 2,627,542 | 2/1953 | Koulomzine | 33/364 X |
| 3,462,830 | 8/1969 | Sharpe | 33/346 X |

FOREIGN PATENT DOCUMENTS 10511 of 1907 United Kingdom ...................... 33/364

OTHER PUBLICATIONS

Inspection & Gauging by C. W. Kennedy Pub. Industrial Press of N.Y. pp. 268-270.

Primary Examiner—Harry N. Haroian
Attorney, Agent, or Firm—Lowe, Kokjer, Kircher, Wharton & Bowman

[57] ABSTRACT

A parallel suspension reed type measuring device has its internal components maintained in a weightless condition by a bouyant fluid. A pair of vertical reeds and an amplification arm mechanically amplify the movement which is imparted to a measuring spindle in response to a quantity being measured. The measured quantity is magnified optically by a lens system and is projected onto a screen.

8 Claims, 4 Drawing Figures

MEASURING DEVICE

BACKGROUND AND BRIEF DESCRIPTION OF THE INVENTION

This invention relates in general to an improved measuring device which is suitable for use as an indicator in a comparator test set. More particularly, the measuring device of the present invention is comprised of a parallel suspension reed type of measuring device wherein the weight of its moving components is effectively eliminated to thereby improve the accuracy of the measurements made by the device. By maintaining the moving components of the device in a weightless condition, these components are insulated from outside forces and disturbances to thereby ensure that the accuracy of this device is not affected by external factors such as position, gravity, temperature, etc.

Accurate measurement represents one of the most critical aspects of industrial inspection and production. Because a measurement is only as precise as the instrument used in making it, all measuring devices and particularly those used by industry should be extremely reliable in terms of accuracy and repeatability. In other words, it is highly desirable for a measuring device which is frequently used by industry to be capable of repeatedly providing accurate measurements. Another desirable feature of any measuring device is that it exhibit a short lag time between start and readout of the measurement. Finally, it is extremely important for a measuring device to be easy to use and capable of producing high amplification of the measured quantity without appreciable distortion of the measurement.

A reed measuring device represents a presently known measuring device which exhibits many of these characteristics. A reed measuring device is comprised of a pair of blocks which are positioned adjacent to each other and are joined together by a pair of parallel reed suspension springs. One of the blocks is rigidly fixed while the other block is free to move relative to the stationary block. The movable block has a measuring spindle connected to its bottom and a vertical reed attached to the inside top part of the block. A second vertical reed is similarly attached to the inside top part of the stationary block. The two vertical reeds are then connected to each other at their upper ends and a pointer is attached to them at this point. During the gauging or measuring operation, the gauging spindle is brought in contact with the piece to be measured causing the movable block to be moved upward in response to the measured dimension of the piece. This upward movement of the movable block causes the vertical reed attached to this block to slip past the vertical reed attached to the stationary block. Since these reeds are joined at their upper ends, movement of one reed past the other reed is prevented causing both of the reeds to swing through an arc which is representative of the measured quantity. The pointer moves in unison with these reeds to mechanically amplify the measured quantity. This arcuate movement of the pointer is then converted into a reading suitable for display.

Since this measuring device employs no gears, bearing surfaces or rubbing contacts, friction and surface wear between the movable components of this device are entirely eliminated. As a result, this measuring device is extremely reliable when properly used. This device, however, possesses an inherent disadvantage which is common to all fulcrum and lever type of measuring devices. In particular, the weight of the moving components can and do have a significant impact upon the operation of the device if the device is not used in a truly vertical position. If the measuring device is improperly positioned, the weight of the floating block is not properly carried by the reeds and the accuracy of the measurement is correspondingly affected. Accordingly, this type of measuring device is accurate only when it is used in a truly vertical position.

The measuring device of the present invention, however, overcomes this problem by maintaining its movable components in a weightless condition. In particular, the movable block is constructed to have a hollow inner cavity which is either evacuated or filled with a gas that increases the buoyancy of the block. The vertical reeds are in turn attached to each other by means of a buoyant joining piece which is also constructed to have a hollow inner cavity. The inner cavity of the buoyant joining piece is either evacuated or filled with a gas that increases the buoyancy of this piece. A hollow amplification arm is attached to the buoyant joining piece to mechanically amplify the arcuate movement imparted to this piece during a measurement. The hollow portion of the amplification arm is either evacuated or filled with a gass which increases the buoyancy of this component. The movable components are also encompassed by a fluid having a density which substantially reduces the weight of these components. Through proper selection of the gas used to fill the hollow cavity in the movable block, the buoyant joining piece and the amplification arm and the fluid used to encompass these components, the movable components of the device are maintained in a weightless condition.

By maintaining the movable components in a weightless condition, the parallel reed suspension springs are only used to provide gauging pressure and to align the movable components of the device. Since the parallel reed suspension springs do not have to support the weight of the movable components, the measuring device of the present invention may be used in any position without a detrimental effect upon the accuracy of the measurements made by the device. In addition, the parallel reed suspension springs and vertical reeds can now be made to have a thinner more flexible nature. As a result of this type of construction, the measuring device of the present invention is capable of providing high amplification while still exhibiting low gauging pressure. Another advantage of this measuring device is that it is capable of providing greater amplification of the quantity being measured. The degree of amplification is established by the length of the flexible portion of the vertical reeds divided by the distance between the center line of these reeds plus the length of the amplification arm. By making the vertical reeds thinner, the center line of these reeds can be positioned closer together to thereby increase the degree of amplification while reducing the size of the device. As a result, the measuring device of the present invention is more compact, easier to use, and less expensive than the reed measuring devices which are presently available.

The measuring device of the present invention exhibits the added feature of providing improved magnification of the amplified measurement for readout. In the preferred embodiment of the invention, a target is attached to the amplification arm for movement in combination therewith. This target is comprised of a transparent material having a curved shape and a graduated face. The face of the target is then magnified by means of a lens system which is comprised of an objective lens positioned near the target and an occular lens appropriately positioned with respect to the objective lens. By properly arranging the distance between these lenses, they operate as an inverted microscope to provide an enlarged image of at least a portion of the target. The image of the target is then focused through an eye piece for projection onto a screen comprising ground glass or a similar type of material for easier readout of the magnified measurement. The screen has a reference line etched on it to provide a reference point from which readings may be made. This type of lens system allows for the measuring device to be capable of being made more compact and greatly extends the useful range of the instrument by eliminating the need for a long light path or complex electrical circuitry.

It is therefore an object of the present invention to provide a measuring device wherein the device's movable components are maintained in a weightless condition to improve the accuracy of the device.

Another object of the present invention is to provide an improved measuring device of the character described which is capable of providing extremely accurate measurements regardless of the position of the device.

Another object of the present invention is to provide an improved measuring device of the character described which is capable of accurately amplifying the measured quantity.

A further object of the present invention is to provide an improved measuring device of the character described which includes an inherent dampening effect which significantly decreases lag time between the start of the measurement and readout of the measured quantity.

An additional object of the present invention is to provide a measuring device of the character described which is capable of providing high amplification while still exhibiting low gauging pressure.

Another object of the present invention is to provide a measuring device of the character described which is capable of producing a greater degree of amplification in a fairly compact device thereby making the device small in size, easy to use and low in cost.

An additional object of the present invention is to provide an improved measuring device of the character described which is capable of providing accurate measurements which are not effected external factors such as position, gravity, temperature, etc.

It is another object of the present invention to provide an improved measuring device of the character described which is capable of magnifying the amplified measurement to facilitate readout of the measured quantity.

It is a further object of the present invention to provide an improved measuring device of the character described which is capable of being incorporated into a hand tool.

Other and further objects of this invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are employed to indicate like parts in the various views.

Figure 1:
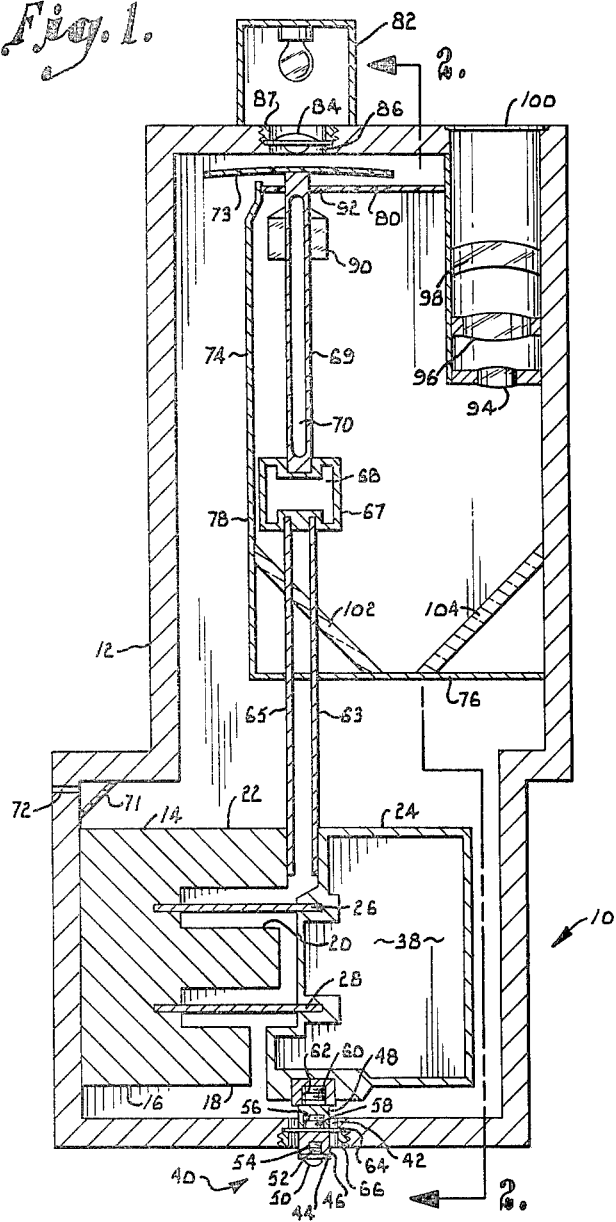
FIG. 1 is a front sectional view of a measuring device constructed in accordance with a preferred embodiment of the present invention.
Figure 2:
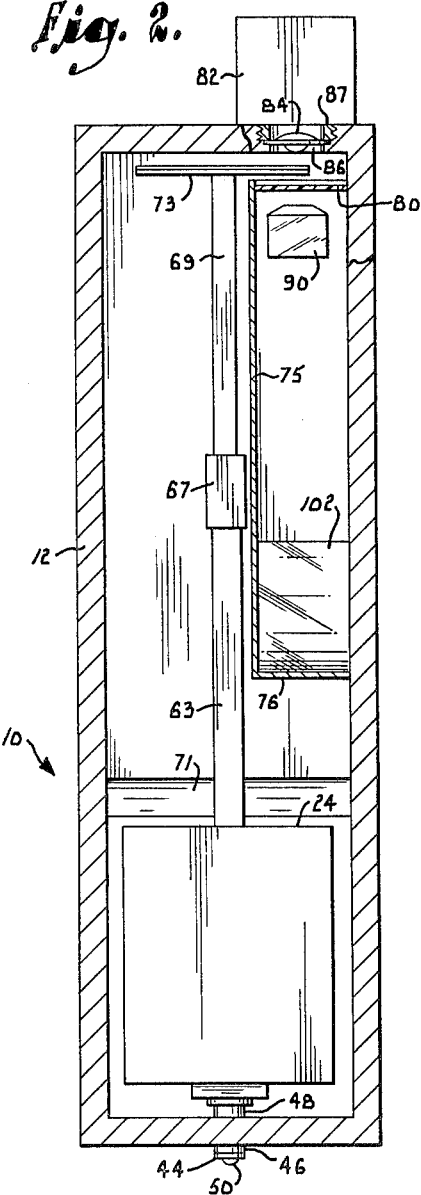
FIG. 2 is a sectional view taken along 2—2 of FIG. 1 with portions broken away for the purposes of illustration.

Referring now to FIGS. 1 and 2, numeral 10 generally designates a measuring device constructed in accordance with a preferred embodiment of the present invention. This measuring device is provided with an outer casing 12 which is capable of containing a fluid therein. The outer casing is arranged to completely enclose the operable components of the device and is constructed of plastic or a sturdy metal which is not subject to oxidation. The outer casing may, however, be constructed of a metal which is subject to oxidation if the inner surface of the device is provided with a non-corrosive coating.

The operable components of the measuring device include a stationary block 14 which is fixedly secured to the inner surface of the outer housing. Block 14 has a rectangular base portion 16 and three rectangular extending portions 18, 20 and 22 which protrude outward from the base portion to form an E shaped structure. This block is constructed of a sturdy material such as plastic, glass, or a metal which is not susceptible to corrosion. The block may also be made out of a corrosive metal if the exterior of the block is properly treated to prevent corrosion thereof.

The measuring device also includes a movable block 24 which is coupled with the fixed block 14 by means of a pair of gauging pressure and guide springs 26 and 28. Block 24 is constructed of a sturdy, lightweight material such as glass, quartz or any lightweight metal which is not subject to corrosion. The movable block may also be constructed of a lightweight metal which is subject to corrosion if the outer surface of this block is properly treated to prevent corrosion thereof. The movable block is made to have a hollow inner chamber 38 which is either evacuated or filled with a gas that increases the buoyancy of the block.

The gauging pressure and guide springs 26 and 28 serve to couple the movable block 24 with the stationary block 14. In particular, one end of spring 26 is fixedly secured to stationary block 14 between extending portions 20 and 22 while the other end of this reed is fixedly secured to the movable block 24. Spring 28, on the other hand, is fixedly secured to stationary block 14 between extending portions 18 and 20 and to the movable block 24. These springs are constructed of a material having an elastic nature such as steel. Since the movable components of this device are maintained in a weightless condition the gauging pressure and guide springs do not have to support any of the weight of these components and are only used for alignment purposes. As a result, these springs may be constructed to have a thinner more flexible nature thereby allowing the measuring device of the present invention to exhibit a low gauging pressure.

A measuring spindle 40 is attached to the bottom portion of the movable block so as to pass through a spindle opening 42 in the outer housing of the measuring device. Measuring spindle 40 is comprised of a removable tip 44, a cylindrically shaped lower mounting piece 46 and a cylindrically shaped upper mounting piece 48. The removable tip 44 is constructed to have a contacting surface 50 which is made of a wear resistant material such as hardened steel. A threaded pin 52 is integrally formed with the tip's contacting surface to extend outward therefrom at a right angle therewith. This pin is arranged to be received by an internally threaded aperture 54 in the lower mounting piece 46. The lower mounting piece 46 is in turn attached to the upper mounting piece 48 by means of a threaded pin 56 which is received by an internally threaded aperture 58 in the bottom surface of the upper mounting piece. The upper mounting piece is finally attached to the bottom portion of the movable block by means of a threaded pin 60 which is fixed to the top surface of the upper mounting piece. This pin is received by an internally threaded aperture 62 which is defined in the bottom of the movable block.

A membrane 64 is provided to form a fluid seal about the measuring spindle. This membrane is fixed to the outer casing of the measuring device by means of an O-shaped mounting ring 66. Mounting ring 66 is provided with a threaded outer surface which is threadably engaged by an enlarged portion of spindle opening 42. As mounting ring 66 is tightened, the membrane is pinched between this ring and the outer casing of the measuring device to secure the membrane in place within the spindle opening. A hole (now shown) in the center of this membrane allows threaded pin 58 to pass through it en route to engagement with internally threaded aperature 58. As the lower mounting piece is brought in contact with the upper mounting piece, the membrane is pinched between the top surface of the lower mounting piece and the bottom surface of the upper mounting piece to form a fluid seal therewith. Membrane 64 is of a flexible nature which allows it to move in combination with the measuring spindle. While this membrane has an effect on the gauging pressure of the device, the resultant effect of this membrane is so negligable that it does not have an appreciable effect upon the accuracy of the device. A vertical reed 63 is attached to the upper portion of movable block 24 to extend upward therefrom at a right angle therewith. Another vertical reed 65 is attached to extending portion 22 of stationary block 14 to extend upward from this block at a right angle therewith. The free ends of these reeds are in turn connected to each other by means of a buoyant joining piece 67. The buoyant joining piece is constructed of a sturdy, lightweight material such as glass, quartz or any lightweight metal which is not subject to corrosion. This piece may also be constructed of a corrosive metal if the outer surface of the block is provided with a non-corrosive coating. The buoyant joining piece has a hollow inner cavity 68 which is either evacuated or filled with a gas that increases the buoyancy of this piece and the vertical reeds to which it is attached.

An amplification arm 69 is attached to the buoyant joining piece to mechanically amplify the arcuate movement imparted to this piece during a measurement. The amplification arm is constructed of a sturdy, lightweight metal which is not susceptible to corrosion. The amplification arm may also be constructed of a sturdy, lightweight metal which is subject to corrosion if the exterior of this arm is properly treated with a non-corrosive coating. The amplification arm is provided with a hollow inner chamber 70 which may be either evacuated or filled with a gas that increases the buoyancy of this piece.

A flexible membrane 71 is secured to the inner surface of the outer casing to form an air space over an opening 72 in the outer casing of the device. Membrane 71 cooperates with opening 72 to compensate for variations in the pressure of the fluid contained within the outer casing of the device.

A target 73 is attached to the free end of the amplification arm for movement in combination therewith. The target is constructed of a transparent material and has a scale imprinted on it to provide an indication of the relative position of the device's movable components to thereby provide a reading of the quantity being measured.

Optical magnification of the reading is performed by a series of lenses which are arranged to form an inverted microscope. These lenses are appropriately mounted within a watertight chamber 74 which is positioned in the housing of the device so that the top wall 75 of the chamber sits below the amplification arm of the device. This chamber is also formed by a plurality of lateral side walls 76, 78 and 80 which are fixedly secured to the outer housing of the device and to the top wall of the chamber to form a closed watertight chamber.

A light source 82 is secured to the outer housing and oriented to project a beam of light onto the target through a condenser 84 which is appropriately mounted within an opening 86 in the outer housing of the device by means of an O-shaped mounting ring 87. The condenser is mounted to the outer housing to form a watertight seal therewith.

The lenses which are used to magnify the reading on the target include an objective lens 90 which is positioned adjacent to a transparent window 92 in the chamber which encloses the lens system, an ocular lens which is comprised of lenses 94 and 96, and a simple achromatic lens 98 which is capable of projecting an image onto a screen 100. The objective lens operates to provide an enlarged image of the portion of the target which is in front of the transparent window 92. The enlarged image is then transferred by means of reflective devices 102 and 104 to the ocular lens for further magnification of the image. Reflective devices 102 and 104 are either comprised of mirrors or prisms which are appropriately positioned to transmit the image produced by the objective lens to the ocular lens. The magnified image is then projected onto a screen 100 by means of lens 98 to allow for easier viewing of the reading. A reference line is etched or otherwise imprinted on screen 100 to provide a set reference point from which readings can be made. It should be emphasized at this time that the shown lenses and orientation thereof are merely illustrative and are not intended to limit the scope of this invention to a particular lens system.

Figure 3:
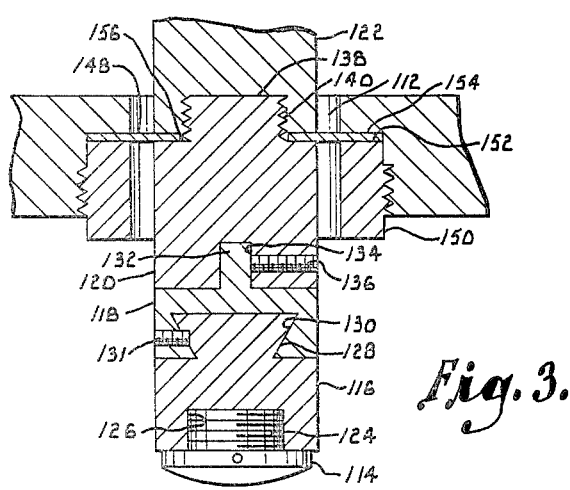
FIG. 3 is an enlarged view of another embodiment of a measuring spindle suitable for use with the measuring device of the present invention.
Figure 4:
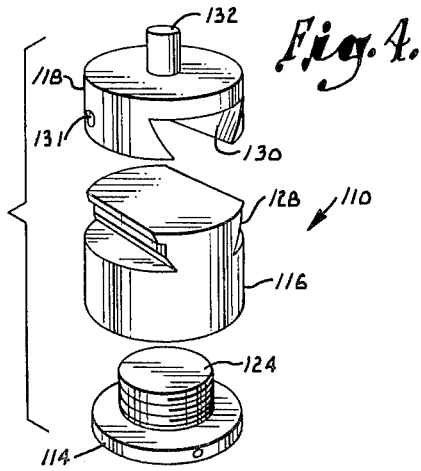
FIG. 4 is an exploded view of the measuring spindle shown in FIG. 3.

Referring now to FIGS. 3 and 4 a second measuring spindle 110 which is preferrable for use at high amplification is shown in these figures. This measuring spindle, like the spindle shown in FIGS. 1 and 2, is attached to the bottom of the floating block and passes through a spindle opening 112 in the housing of the measuring device. As shown in these figures, this measuring spindle is comprised of a contact tip 114, a pair of cylindrically shaped adjusting pieces 116 and 118, a cylindrically shaped lower mounting piece 120 and a cylindrically shaped upper mounting piece 122.

The contact tip 114 is constructed of a wear resistant material such as hardened steel and is provided with a threaded member 124 which protrudes upward from the top surface of the tip at a right angle therewith. Member 124 is threadably engaged by an internally threaded opening 126 which is defined in the bottom surface of adjusting piece 116 to removably secure the contact tip to this piece. Adjusting piece 116 is provided with a dovetail 128 which protrudes upward from the top surface of this piece. This dovetail is in turn received by a mortise 130 in the adjusting piece 118. A locking screw 131 is used to fix the position of the dovetail 128 within the mortise 130.

Adjusting piece 118 is provided with a mounting pin 132 which protrudes upward from the top surface of the piece at the center axis thereof. This mounting pin is in turn received by an aperture 134 which is defined in the bottom surface of the lower mounting piece at the center axis thereof. A locking screw 136 is provided to secure mounting pin 132 in place within aperture 134.

The lower mounting piece 120 is in turn attached to the upper mounting piece by means of a threaded pin 138. This pin is attached to the upper surface of the lower mounting piece and protrudes upward therefrom at a right angle therewith. An internally threaded opening 140 is defined in the bottom surface of the upper mounting piece 122 to threadably receive pins 138 to thereby secure the lower mounting piece to the upper mounting piece.

A membrane 148 is located between the upper and lower mounting pieces to form a watertight seal about the measuring spindle. This membrane is secured to the outer housing of the measuring device by means of an O-shaped mounting ring 150 which has a threaded outer surface. The O-shaped mounting ring is arranged to sit within the enlarged portion of opening 112. The enlarged portion of this opening is internally threaded to engage the outer surface of the mounting ring. As the ring is tightened, the membrane is pinched between the top surface 152 of this ring and the top wall 154 of the enlarged portion of opening 112 to secure the membrane in place within this opening. Membrane 148 is provided with a center hole 156 which passes threaded pin 138 for engagement with internally threaded aperture 140. Once the lower mounting piece is firmly secured to the upper mounting piece, the membrane is pinched between these two mounting pieces to fixedly secure the membrane between these pieces to form a watertight seal about this measuring spindle.

In operation, the movable components of the measuring device are maintained in a weighless condition to thereby insulate these components from various external factors such as position, gravity, termperature, etc. To achieve this condition the outer casing is filled with a fluid which totally encompasses the movable components of the device. In addition, the hollow portions of movable block 24 buoyant joining piece 67 and amplification arm 69 are either evacuated or filled with a gas which increases the buoyancy of these components. Through proper selection of the fluid which encompasses the movable components and of the gas placed within the movable block, the weight of the movable block vertical springs, buoyant joining piece and amplification arm may be totally eliminated or reduced to a point where it has a negligible effect upon the measurement. Selection of this fluid is determined in accordance with the combined weight of the movable components of the device. In particular, the selected fluid should have a density which matches the density of the movable block vertical reeds, buoyant joining piece and amplifications arm when the inner portion of these components are either evacuated or filled with gas. In this way, the weight of these components is either totally eliminated or reduced to the point where it is negligible.

Thereafter, the measuring device is mounted on the stand of a comparator test set so that the measuring spindle is capable of contacting a measuring standard which is placed on the base of the test set. In particular, the measuring device is positioned on the stand so that the reading on the target is at a set zero position.

Once the measuring device is properly positioned on the stand of the test set, a test piece is placed on the base of the test set and oriented so that the measuring spindle 40 comes in contact with the outer surface of this piece along the dimension to be measured. As the measuring spindle is brought in contact with the piece being measured, the spindle is moved a distance corresponding to the measured dimension of the piece. Since the measuring spindle is physically attached to the movable block 24, movement of the spindle is in turn imparted to this block causing the gauging pressure and guide springs to deflect slightly. Movement of the movable block also causes its vertical reed 63 to be laterally moved a distance corresponding to the quantity being measured. Since the vertical reeds 63 and 65 are attached to each other by means of the buoyant joining piece 67, lateral movement of reed 63 causes both of these reeds to swing through an arc which is proportional to the measured quantity. This arcuate movement of the vertical reeds and buoyant joining piece is then mechanically amplified by the amplification arm 69. The amount of mechanical amplification is controlled by the length of the amplification arm. A unique feature of the measuring device of the present invention is that the amplification arm can be made as long as necessary to provide the desired amplification without any adverse effects upon the accuracy of the measurement since the arm is maintained in a weightless condition.

Movement of the amplification arm causes target 73 to move in unison therewith to provide a readout of the quantity being measured. In a normal comparator test set, the measuring device is arranged to obtain a reading indicative of the difference between the measured dimension of the measuring standard and the measured dimension of the test piece. Since the movement of the target by the amplification arm is directly proportional to the distance the measuring spindle has been moved, the target may be ruled to provide an accurate readout of the quantity being measured.

Optical magnification of this readout is performed by a series of lenses. In particular, the portion of the target adjacent to the concentrator 84 is illuminated by light source 82. The concentrator is an auxiliary lens which is operable to condense the light from the light source to brightly and uniformly illuminate the target.

An enlarged image of this portion of the target is produced by the objective lens 90 which is aligned with the light source and concentrator. The enlarged image is then directed to the ocular by means of reflective devices 102 and 104. The ocular is comprised of a pair of lenses 94 and 96 which cooperate to further magnify the enlarged image of the target. Another lens 98 is then used to project the magnified image of the target onto screen 100 for viewing.

It should be pointed out at this time that the gauging pressure of this device is solely determined by the gauging pressure and guide springs, the rigidity of the membrane 64, and the amount of fluid contained within the device. As the amount of fluid increases, the pressure exerted on membrane 64 also increases. To keep this pressure from affecting the accuracy of the measurement, it is desirable to keep the amount of fluid at a minimum. In addition, the size of the spindle opening 42 should be made as small as possible to minimize the surface area of membrane 64 thereby providing less surface area on which the fluid may act. The amount of fluid contained within the outer housing may be minimized through design features which are readily apparent to those of ordinary skill in the art. For example, various spacer blocks may be strategically placed within the measuring device to fill the open areas which would otherwise be occupied by fluid. These spacer blocks have not been shown in these figures for purposes of clarity and to facilitate the description of the device.

The measuring spindle shown in FIGS. 3 and 4 is preferable for use in high amplification devices. This measuring spindle also allows for accurate calibration of the measuring device.

Calibration of the device is performed before the buoyant joining piece, amplification arm and target are attached to the vertical reeds. The device to be calibrated is then mounted on a comparator test set and lowered until the contacting tip of the measuring spindle just comes in contact with an accurate spring type scale. Thereafter, the fixed block is lowered until a desired amount of force is exerted on the scale. The adjusting pieces of the device are then manipulated until both of the vertical reeds are parallel to each other. In this way the device can be calibrated to provide a desired amount of gauging pressure while still maintaining the measuring spindle in a preferred position directly below and in line with the lines of force exerted by the gauging pressure and guide springs upon the movable block. The buoyant joining piece is then attached to the vertical reeds. An amplifying arm and target are then temporarily attached to the buoyant joining piece. A measuring standard is then placed on the comparator test set and the measuring device is adjusted until the target is in a zero position. Thereafter, a second measuring standard is put on the comparator test set. The second measuring standard differs from the first standard by a known quantity which is preferably one-half the range of the instrument. A reading is then taken to check the accuracy of the device. If the last graduation on the scale corresponds exactly to this value, the amplifying arm is permanently attached to the buoyant joining piece and the measuring device is fully assembled. If the reading on the target falls short of a full scale deflection, amplification arms of increasing length are then attached to the buoyant joining piece until a full scale deflection is obtained. A greater than full scale deflection is corrected, on the other hand, by using an amplification arm of a shorter length. In this way the degree of amplification can be varied simply by changing the length of the amplification arm.

Having thus described the invention, I claim:

1. A measuring device suitable for use as the indicator in a comparator test set, said measuring device comprising:
   an outer housing;
   a stationery block fixedly secured to said outer housing;
   a movable block;
   a pair of gauging pressure and guide springs for coupling said movable block to said stationary block such that said movable block is capable of moving relative to said stationary block;
   means for imparting movement to said movable block in response to a measurement;
   a first vertical reed fixedly secured to said stationery block such that said first vertical reed projects outward from said stationary block;
   a second vertical reed fixedly secured to said movable block to move in combination therewith, said second vertical reed being secured to said movable block such that said second vertical reed projects outward from said movable block and is generally parallel to said first vertical reed;
   a bouyant joining piece for coupling said first vertical reed with said second vertical reed such that said bouyant joining piece is capable of moving through an arc in response to movement of said second vertical reed in response to a measurement;
   an amplification arm attached to said bouyant joining piece to move in combination therewith to thereby mechanically amplify the arcuate movement of said bouyant joining piece;
   means for converting movement of said amplification arm into an indication of the quantity being measured; and
   a fluid contained within said outer housing so as to completely encompass said movable block, said first vertical reed, said second vertical reed, said bouyant joining piece and said amplification arm, said fluid having a density sufficient to reduce the weight of said movable block, said first vertical reed, said second vertical reed, said bouyant joining piece and said amplification arm.

2. The measuring device as in claim 1 wherein a hollow inner cavity is defined within said floating block, said hollow inner cavity being conditioned to increase the bouyancy of said floating block within said fluid.

3. The measuring device as in claim 1 wherein a hollow inner cavity is presented within said amplification arm, said hollow inner cavity being conditioned to increase the bouyancy of said amplification arm within said fluid.

4. The measuring device as in claim 1 wherein a hollow inner cavity is presented within said bouyant joining piece, said hollow inner cavity being conditioned to increase the bouyancy of said bouyant joining piece within said fluid.

5. The measuring device as in claim 1 wherein said means for converting movement of said amplification arm into an indication of the quantity being measured is comprised of:
   a target coupled with said amplification arm for movement in combination therewith, said target having a ruled portion to provide an indication of the distance said target is moved,
   an objective lens means positioned adjacent to said target for producing an enlarged image of at least a portion of the ruled portion of said target, and
   an ocular lens means for magnifying the enlarged image of said target which is produced by said objective lens means.

6. The measuring device as in claim 5 including means for projecting the magnified image produced by said ocular lens means into a screen for viewing.

7. The measuring device as in claim 1 wherein said means for imparting movement to said movable block in response to a quantity being measured is comprised of:
- a contacting piece having a dovetail attached to the upper surface thereof;
- an adjusting piece having a mortise defined in its bottom surface, said mortise being arranged to accept said dovetail, said adjusting piece also having a mounting pin protruding outward from the upper surface thereof;
- a mounting piece having an opening defined in the bottom surface thereof to accept said mounting pin, said mounting piece being coupled on the said movable block.

8. A measuring device suitable for use as the indicator in a comparator test set, said measuring device comprising:
- an outer housing;
- a stationary block fixedly secured to said outer housing;
- a movable block;
- a pair of gauging pressure and guide springs for coupling said movable block to said stationary block such that said movable block is capable of moving relative to said stationary block;
- a contacting piece having a dovetail attached to the upper surface thereof;
- an adjusting piece having a mortise defined in its bottom surface, said mortise being arranged to accept said dovetail, said adjusting piece also having a mounting pin protruding outward from the upper surface thereof;
- a mounting piece having an opening defined in the bottom surface thereof to accept said mounting pin, said mounting piece being coupled on the said movable block to impart movement thereto in response to a measurement;
- a first vertical reed fixedly secured to said stationary block such that said first vertical reed projects outward from said stationary block;
- a second vertical reed fixedly secured to said movable block to move in combination therewith, said second vertical reed being secured to said movable block such that said second vertical reed projects outward from said movable block and is generally parallel to said vertical reed;
- a bouyant joining piece for coupling said first vertical reed with said second vertical reed such that said bouyant joining piece is capable of moving through an arc in response to movement of said second vertical reed in response to a measurement;
- an amplification arm attached to said bouyant joining piece to move in combination therewith to thereby mechanically amplify the arcuate movement of said bouyant joining piece;
- means for converting movement of said amplification arm into an indication of the quantity being measured; and
- weight compensating means for eliminating any effect upon the accuracy of said indication as a result of the weight of said movable block, said first vertical reed, said second vertical reed, said bouyant joining piece and said amplification arm.

* * * * *